(12) United States Patent
Raajan et al.

(10) Patent No.: US 10,560,736 B2
(45) Date of Patent: Feb. 11, 2020

(54) SYSTEM AND METHOD FOR PROVIDING IN-VEHICLE SERVICES TO COMMUTERS

(71) Applicant: ANI TECHNOLOGIES PRIVATE LIMITED, Bengaluru, Karnataka (IN)

(72) Inventors: Nagamani Raajan, Tamilnadu (IN); Vasuki K. Setlur, Karnataka (IN)

(73) Assignee: ANI Technologies Private Limited (IN)

( * ) Notice: Subject to any disclaimer, the term of this patent is extended or adjusted under 35 U.S.C. 154(b) by 0 days.

(21) Appl. No.: 15/940,268

(22) Filed: Mar. 29, 2018

(65) Prior Publication Data
US 2019/0208254 A1    Jul. 4, 2019

(30) Foreign Application Priority Data

Dec. 29, 2017 (IN) .............................. 201741047370

(51) Int. Cl.
| | | |
|---|---|---|
| *H04N 21/414* | (2011.01) | |
| *G06F 16/435* | (2019.01) | |
| *G06F 16/438* | (2019.01) | |

(52) U.S. Cl.
CPC ..... *H04N 21/41422* (2013.01); *G06F 16/437* (2019.01); *G06F 16/438* (2019.01)

(58) Field of Classification Search
CPC ......... H04N 21/41422; H04N 21/2146; H04N 21/4126; H04N 7/18; H04N 21/4622; H04N 21/214; H04N 21/41407; G06F 16/438; G06F 16/437
USPC ........................................................ 725/75
See application file for complete search history.

(56) References Cited

U.S. PATENT DOCUMENTS

| | | | | |
|---|---|---|---|---|
| 5,675,752 A | * | 10/1997 | Scott .......................... | G06F 8/38 715/866 |
| 8,082,569 B2 | | 12/2011 | Brady, Jr. et al. | |
| 8,135,773 B2 | | 3/2012 | Stopniewicz et al. | |
| 9,430,476 B2 | | 8/2016 | Bai et al. | |
| 2008/0040756 A1 | * | 2/2008 | Perlman ............. | B64D 11/0015 725/75 |
| 2011/0107377 A1 | * | 5/2011 | Petrisor ............. | H04L 12/40182 725/76 |

(Continued)

OTHER PUBLICATIONS

Sebastian, J., "Pune Startup to Provide In-Cab Entertainment for Uber in India", Moneycontrol.com., Jun. 2, 2017, pp. 1-2.

(Continued)

*Primary Examiner* — Nathan J Flynn
*Assistant Examiner* — Cynthia M Fogg
(74) *Attorney, Agent, or Firm* — Goldberg Segalla

(57) ABSTRACT

A method and a system for providing in-vehicle services to commuters are provided. A first device transmits online and offline applications to a second device. The online and offline applications are rendered on the second device by way of a first master application installed on the second device. The first device receives one of a first or second request from the second device indicating a selection of an online or offline application, respectively. The first device retrieves one of a first multimedia file from a first memory of the first device in response to the first request or a second multimedia file from a first server in response to the second request. The first device streams one of the first or second multimedia file to the second device.

10 Claims, 9 Drawing Sheets

(56) References Cited

U.S. PATENT DOCUMENTS

| | | | |
|---|---|---|---|
| 2011/0314502 A1* | 12/2011 | Levy | H04N 7/106 |
| | | | 725/46 |
| 2013/0103779 A1* | 4/2013 | Bai | H04L 67/2833 |
| | | | 709/213 |
| 2013/0167159 A1* | 6/2013 | Ricci | H04W 4/90 |
| | | | 719/319 |
| 2013/0325856 A1* | 12/2013 | Soto Matamala | H04W 4/21 |
| | | | 707/724 |
| 2015/0334171 A1 | 11/2015 | Baalu et al. | |
| 2016/0066004 A1* | 3/2016 | Lieu | H04N 21/2541 |
| | | | 725/29 |
| 2016/0066013 A1* | 3/2016 | Li | H04N 21/2541 |
| | | | 725/75 |
| 2016/0381412 A1* | 12/2016 | Couleaud | H04N 21/4316 |
| | | | 725/46 |

OTHER PUBLICATIONS

"Jet Airways Launches In-Flight Mobile Entertainment Streaming", Press Trust of India, Sep. 5, 2016, pp. 1-2.

* cited by examiner

SYSTEM AND METHOD FOR PROVIDING IN-VEHICLE SERVICES TO COMMUTERS

CROSS-RELATED APPLICATIONS

This application claims priority of Indian Application Serial No. 201741047370, filed Dec. 29, 2017, the contents of which are incorporated herein by reference.

FIELD OF THE INVENTION

The present invention relates generally to a vehicular environment, and more particularly, to a system and method for providing in-vehicle services to commuters.

BACKGROUND

Recent developments in the field of transportation services have led to an evolution of various online platforms that cater to travelling requirements of commuters. Transportation services that offer on-demand vehicle services to the commuters have emerged as a popular solution to combat the ever-increasing demand. In addition, transportation service providers that offer such transportation services have adopted various schemes to provide a pleasant ride experience to their commuters. One such scheme involves using an in-vehicle entertainment system, where the commuters can choose to play various multimedia files of their choice during the ride.

Existing in-vehicle entertainment systems have multimedia content that is stored in either the internal memory of the in-vehicle entertainment systems or in external storage devices, such as compact discs (CDs), universal serial bus (USB) drives, flash drives, and the like. The multimedia content includes multimedia files of various movies, songs, games, and the like. Based on the choice of the commuters travelling in the vehicle, these multimedia files are presented to the commuters during the ride. Since the multimedia content is stored in the internal memory of the in-vehicle entertainment systems or in the external storage devices, the choice offered to the commuters is very limited. Further such multimedia content tends to get outdated very fast as new multimedia content is being created digitally at a very rapid rate.

With the advent of fast speed internet, some transportation service providers have partnered with third-party content providers that provide multimedia content online. Hence, the commuters are offered with a wide variety of new multimedia content which is regularly updated. As the choice of the multimedia content increases, it becomes difficult for the commuters to browse through the wide variety of available multimedia content for selecting the multimedia content of their interest. Hence, the ride experience of the commuters becomes unpleasant. Since the third-party content providers and the transportation service providers lack a common platform, providing personalized multimedia content to different commuters is difficult.

In light of the foregoing, there exists a need for a solution that solves the above mentioned problems and provides a common platform to third-party content providers and transportation service providers for offering personalized multimedia content to different commuters.

SUMMARY

In one embodiment of the present invention, a method and system for providing in-vehicle services to commuters are provided. At least one of a first or second request is received by a first device from a second device over a first communication network. The second device transmits at least one of the first or second request based on at least one of a first input or a second input, respectively. The first or second input is received by way of a first or second application, respectively. The first and second applications are rendered by a first master application installed on the second device. The first device retrieves at least one of a first multimedia file from a first memory of the first device in response to the first request or a second multimedia file from a first server in response to the second request by way of a second communication network. The first device streams at least one of the first multimedia file or the second multimedia file on the second device by way of the first communication network.

In another embodiment of the present invention, a method and system of providing in-vehicle services to commuters are provided. At least one of a first or second request is generated by a first device based on at least one of a first or second input received by way of a first or second application, respectively. The first and second applications are rendered by a first master application installed on the first device. The first device transmits at least one of the first or second request to a second device over a first communication network. At least one of a first or second multimedia file is streamed on the first device by the second device by way of the first communication network, based on at least one of the first or second request, respectively. The second device retrieves the first multimedia file from a first memory of the second device. The second device retrieves the second multimedia file from a first server by way of a second communication network.

Various embodiments of the present invention provide a method and system for providing in-vehicle services to commuters. The system includes first and second devices in a vehicle. The second device includes a display. The first device communicates with the second device by way of a first communication network. The first device communicates with first and second servers over a second communication network. The first server stores a first set of multimedia files. The second server stores offline and online applications that are categorized and ranked. The second server further stores a second set of multimedia files. The second server transmits the second set of multimedia files to the first device. When a commuter begins his/her ride in the vehicle, the first device receives a first set of online applications and the offline applications from the second server based on the ranking and categorization. The first device transmits the first set of online applications and the offline applications to the second device. The second device includes a first master application which renders the first set of online applications and the offline applications for presenting to the commuter. The commuter accesses the first master application to further access the first set of online applications and the offline applications. The commuter provides one of a first input or a second input to the second device to select one application from the offline applications or one application from the first set of online applications, respectively. Based on the first input, the second device transmits a first request to the first device and based on the second input, the second device transmits a second request to the first device. The first device retrieves multimedia files of the second set of multimedia files from a memory of the first device, based on the first request and streams the retrieved multimedia files to the second device. The first device retrieves multimedia files of the first set of multimedia files from the first server, based on the second request and streams the retrieved multimedia files to the second device. The second device renders the streamed multimedia files on the display.

The first master application renders the first set of online applications that are developed by various third-party content providers, based on categorization and ranking performed by the second server. The ranking of the first set of online applications is performed differently for different commuters travelling in a vehicle. Hence, the first master application serves as a common platform between transportation service providers and third-party content providers for offering personalized multimedia content to the commuters. The first master application further improves the ride experience of the commuters by offering personalized multimedia content by way of the ranked offline applications and the ranked first set of online applications.

BRIEF DESCRIPTION OF THE DRAWINGS

The accompanying drawings illustrate the various embodiments of systems, methods, and other aspects of the invention. It will be apparent to a person skilled in the art that the illustrated element boundaries (e.g., boxes, groups of boxes, or other shapes) in the figures represent one example of the boundaries. In some examples, one element may be designed as multiple elements, or multiple elements may be designed as one element. In some examples, an element shown as an internal component of one element may be implemented as an external component in another, and vice versa.

DETAILED DESCRIPTION

As used in the specification and claims, the singular forms "a", "an" and "the" may also include plural references. For example, the term "an article" may include a plurality of articles. Those with ordinary skill in the art will appreciate that the elements in the Figures are illustrated for simplicity and clarity and are not necessarily drawn to scale. For example, the dimensions of some of the elements in the Figures may be exaggerated, relative to other elements, in order to improve the understanding of the present invention. There may be additional components described in the foregoing application that are not depicted on one of the described drawings. In the event such a component is described, but not depicted in a drawing, the absence of such a drawing should not be considered as an omission of such design from the specification.

Before describing the present invention in detail, it should be observed that the present invention utilizes a combination of system components, which constitutes a system that involves multiple devices for providing in-vehicle services to commuters. Accordingly, the components and the method steps have been represented, showing only specific details that are pertinent for an understanding of the present invention so as not to obscure the disclosure with details that will be readily apparent to those with ordinary skill in the art having the benefit of the description herein. As required, detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure. Further, the terms and phrases used herein are not intended to be limiting but rather to provide an understandable description of the invention.

References to "one embodiment", "an embodiment", "another embodiment", "yet another embodiment", "one example", "an example", "another example", "yet another example", and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in an embodiment" does not necessarily refer to the same embodiment.

Figure 1:
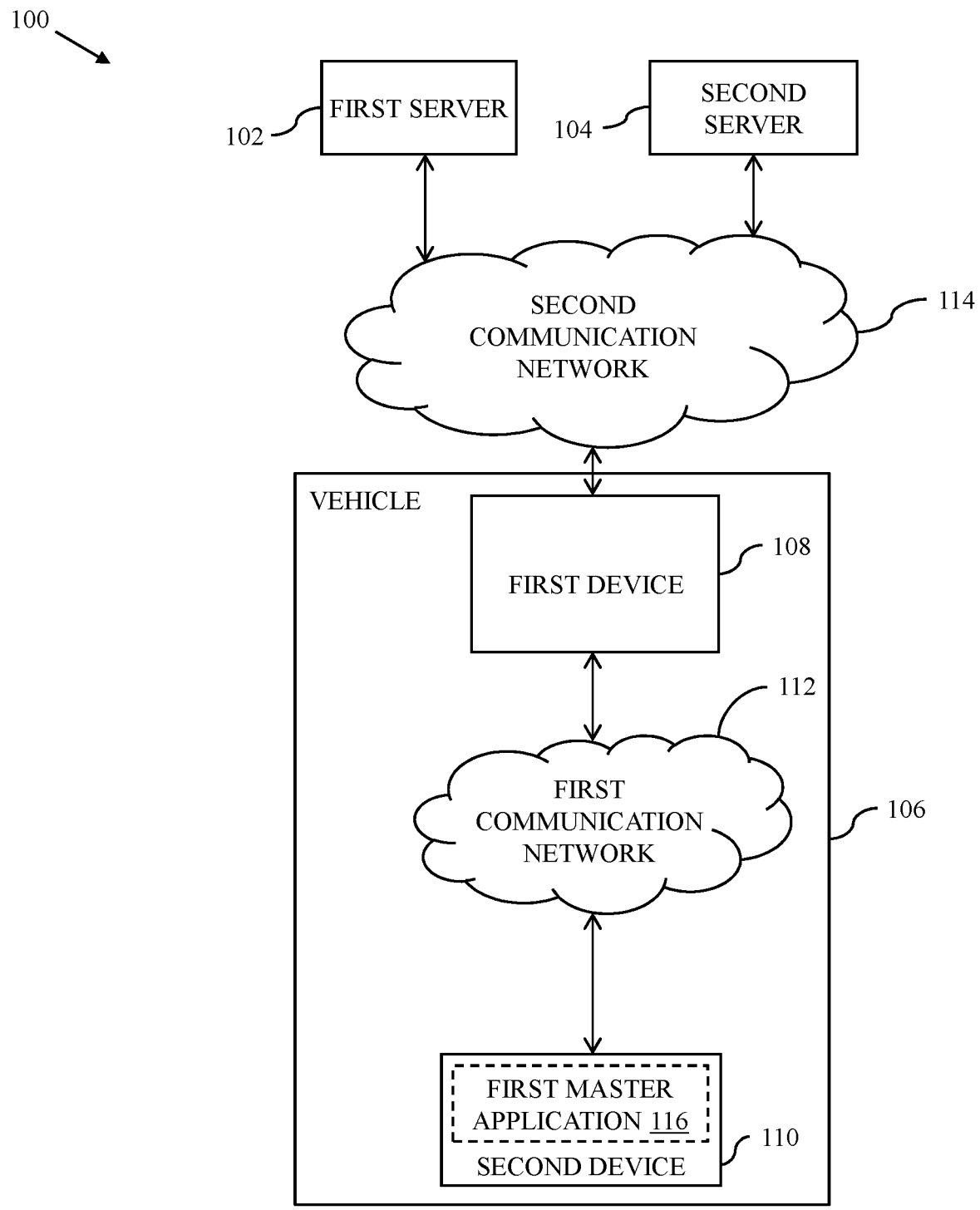
FIG. 1 is a block diagram that illustrates a system environment for providing in-vehicle services to commuters, in accordance with an embodiment of the present invention.

Referring now to FIG. 1, a block diagram that illustrates a system environment 100 for providing in-vehicle services to commuters, in accordance with an embodiment of the present invention, is shown. The system environment 100 includes a first server 102 and a second server 104. The system environment 100 is implemented in a vehicular environment that includes a vehicle 106. The vehicle 106 includes first and second devices 108 and 110. The first device 108 communicates with the second device 110 by way of a first communication network 112. The first device 108 further communicates with the first and second servers 102 and 104 by way of a second communication network 114. Examples of the in-vehicle services include entertainment services, networking services, e-commerce services, retail services, tourism services, food services, or the like. It will be apparent to a person having ordinary skill in the art that the disclosed embodiments may be implemented by using multiple first servers, such as the first server 102, and multiple second devices, such as the second device 110, without departing from the spirit of the invention.

The first server 102 is a third-party server associated with a first third-party content provider for managing multimedia content. The multimedia content includes a first set of multimedia files of different movies, television shows, songs, audiobooks, interactive games, social media webpages, and the like. The first server 102 stores the first set of multimedia files. The first server 102 further transmits multimedia files from the first set of multimedia files to the first device 108, based on an input of a commuter (not shown) who is travelling in the vehicle 106, by way of the second communication network 114.

The second server 104 is a content and transportation management server associated with a transportation service provider. The second server 104 stores a second set of multimedia files of different movies, television shows, songs, audiobooks, interactive games, and the like. The second server 104 transmits the second set of multimedia files to the first device 108. The second server 104 hosts a set of online applications and a set of offline applications. In one embodiment, the set of online applications is developed by various third-party content providers for presenting corresponding multimedia content to various commuters (not shown) travelling in the vehicle 106 deployed by the transportation service provider. For example, a first online application is developed by the first third-party content provider for presenting the first set of multimedia files to the commuters travelling in the vehicle 106. Each online and offline application is enabled to present multimedia files that are associated with the corresponding application to the commuters. For example, the first online application is associated with the first set of multimedia files and hence is enabled to present the first set of multimedia files to the commuters. The second server 104 ranks and categorizes the set of online applications and the set of offline applications.

The second server 104 further stores commuter profiles of the commuters that have availed the vehicle 106 for travelling. For example, the second server 104 stores a commuter profile of a first commuter, who has travelled in the vehicle 106 in past. Each commuter profile includes details of the corresponding commuter. For example, the commuter profile of the first commuter includes name, age, gender, address, browsing history, historical travel details, and/or the like of the first commuter. The browsing history of each commuter includes a record of multimedia files accessed by each commuter in the past. The travel details of each commuter include details of various locations travelled by each commuter, time and date of travel, or the like.

The first and second servers 102 and 104 are realized through various types of framework servers, such as, but not limited to, a Java framework server, a .NET framework server, a Base4 application server, a PHP framework server, or any other framework server.

The vehicle 106 is a means of transport that is deployed by the transportation service provider to provide transportation services to the commuters. Examples of the vehicle 106 include an automobile, a bus, a train, a ship, an airplane, and the like. The commuters may raise ride requests for travelling in the vehicle 106 from a corresponding pick-up location to a corresponding drop-off location. In one embodiment, the vehicle 106 may include a navigation device (not shown), such as a global positioning system (GPS), for tracking a real-time location of the vehicle 106. The navigation device transmits the tracked real-time locations of the vehicle 106 to the second server 104.

Figure 2:
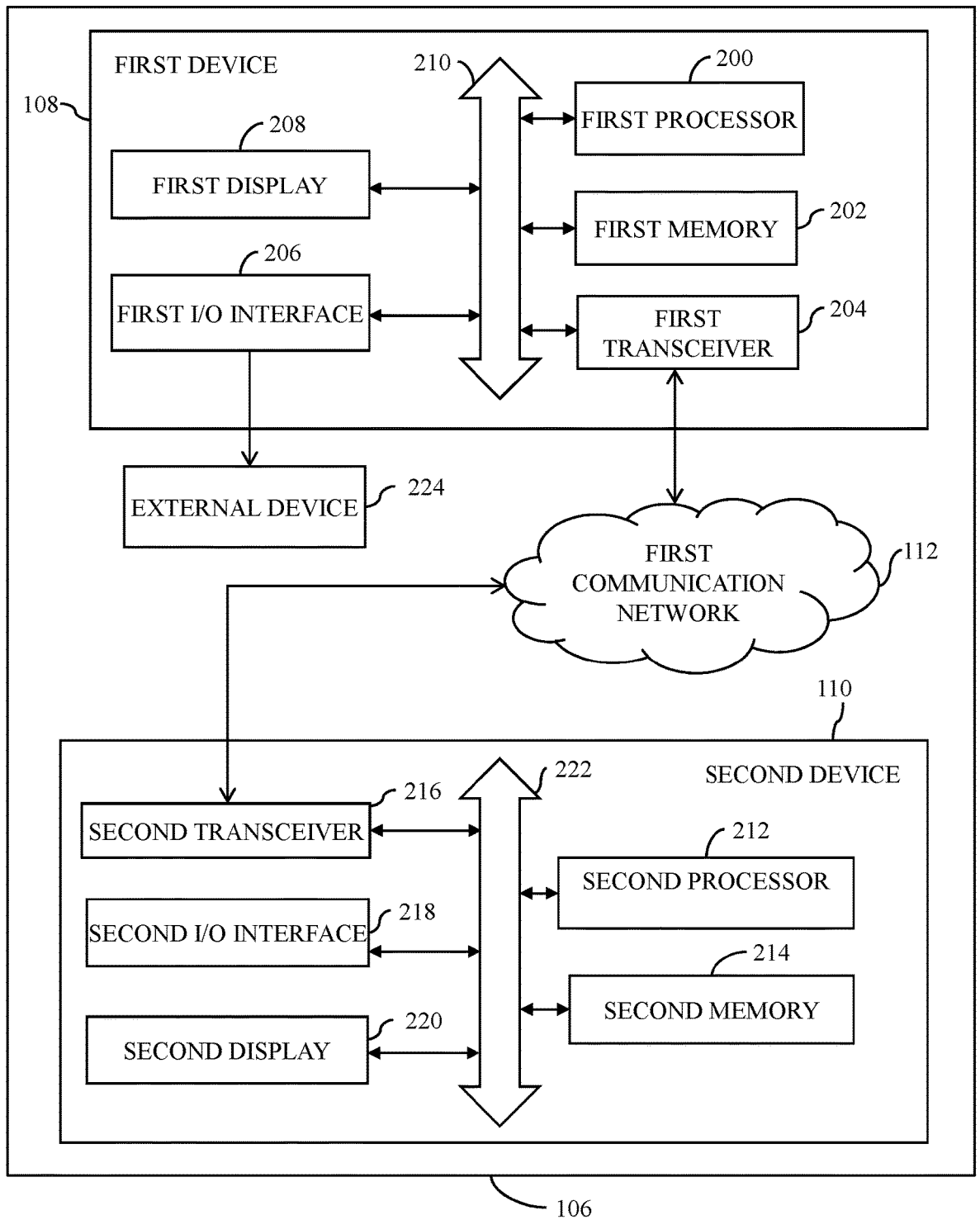
FIG. 2 is a block diagram that illustrates first and second devices of the system environment of FIG. 1, in accordance with an embodiment of the present invention.

In one embodiment, the first device 108 is a vehicle head-unit. In another embodiment, the first device 108 is an external communication device that is placed in the vehicle 106. The first device 108 receives a first subset of online applications from the second server 104, when a commuter begins his/her ride in the vehicle 106. The first subset of online applications is selected from the set of online applications by the second server 104, based on the ranking and categorization of the set of online applications. The first device 108 further receives the set of offline applications from the second server 104. The first device 108 transmits the first subset of online applications and the set of offline applications to the second device 110. The first device 108 receives various requests from the second device 110 based on inputs provided by the commuter, travelling in the vehicle 106. Based on the requests, the first device 108 retrieves multimedia files from at least the first server 102 or a first memory (202 as shown in FIG. 2) of the first device 108. The first device 108 then streams the retrieved multimedia files on to the second device 110 by way of the second communication network 114.

The second device 110 is a computing device placed in the vehicle 106. The second device 110 is used by a commuter, who travels in the vehicle 106. The second device 110 is installed with a first master application 116, which is accessible to the commuter. The first master application 116 may be implemented by way of a code or a program stored in memory of the second device 110. When the commuter begins his/her ride in the vehicle 106, the second device 110 receives the first subset of online applications and the set of offline applications from the first device 108. The first subset of online applications and the set of offline applications are presented to the commuter by way of the first master application 116. In other words, the first master application 116 renders the first subset of online applications and the set of offline applications received from the first device 108. The second device 110 further receives inputs from the commuter for selecting one or more online applications and offline applications (hereinafter referred to as "selected applications") from the first subset of online applications and the set of offline applications, respectively. Examples of the inputs include, but are not limited to, touch screen based inputs, keypad based inputs, voice command based inputs, image based input, hand gesture recognition based inputs, facial gesture recognition based inputs, or any combination thereof. Based on the inputs, the second device 110 transmits the requests to the first device 108 and receives multimedia files that are associated with the selected applications from the first device 108. The second device 110 further presents the received multimedia files to the commuter during the ride by way of the corresponding selected applications. Examples of the second device 110 include a smartphone, a tablet, a phablet, an interactive display device, or any other portable communication device. The elements of the first and second devices 108 and 110 are described in detail in conjunction with FIG. 2.

The first communication network 112 is a short range in-vehicle communication network. The first communication network 112 establishes a communication channel between the first and second devices 108 and 110. Examples of the first communication network 112 include, but are not limited to, a Wi-Fi network, a light fidelity (Li-Fi) network, a Bluetooth network, a near field communication (NFC) network, an infrared network, a fiber optic network, a coaxial cable network, a radio frequency (RF) network, or any combination thereof.

The second communication network 114 is a long range communication network. The second communication network 114 establishes communication channels between the first device 108, the first server 102, and the second server 104. Examples of the second communication network 114 include, but are not limited to, a Wi-Fi network, a Li-Fi network, a local area network (LAN), a wide area network (WAN), a metropolitan area network (MAN), a satellite network, the Internet, an RF network, a mobile network such as cellular data, high speed packet access (HSPA), or any combination thereof. Various devices in the system environment 100 may connect to the second communication network 114 in accordance with various wired and wireless communication protocols, such as Transmission Control Protocol and Internet Protocol (TCP/IP), User Datagram Protocol (UDP), 2nd Generation (2G), 3rd Generation (3G), 4th Generation (4G) communication protocols, Long Term Evolution (LTE) communication protocols, or any combination thereof.

In operation, the second server 104 transmits the second set of multimedia files to the first device 108 by way of the second communication network 114. The first device 108 receives and stores the second set of multimedia files. The second server 104 hosts the set of online applications and the set of offline applications. Examples of the set of online applications and the set of offline applications include, but are not limited to, multimedia player applications, e-commerce applications, banking applications, social-networking applications, news applications, sports applications, gaming applications, or the like. The second server 104 categorizes the set of online applications and the set of offline applications into various categories. The categories may include a sports category, a movie category, a music category, a gaming category, a news category, an online shopping category, an entertainment category, an e-book category, a food delivery category, or the like. The second server 104 categorizes the set of online applications and the set of offline applications based on a content type of the multimedia files that are associated with the corresponding application. In one example, the first set of multimedia files, associated with the first online application, are movies. Thus, the first online application is categorized under the movie category. In another example, the first set of multimedia files, associated with the first online application, are songs. Thus, the first online application is categorized under the music category. In yet another example, the first set of multimedia files, associated with the first online application, are interactive games. Thus, the first online application is categorized under the gaming category. In one embodiment, one online or offline application may be categorized under more than one category. For example, the first online application may be categorized under the movie category and the music category. In another embodiment, a category may have a set of sub-categories. A sub-category represents a niche segment within the corresponding category. For example, the gaming category has the set of sub-categories as strategy gaming, action gaming, sports gaming, and the like. In such a scenario, the second server 104 further categorizes the online and offline applications under each category into the corresponding set of sub-categories.

The second server 104 ranks the set of online applications and the set of offline applications. In one embodiment, the second server 104 may rank the set of online applications and the set of offline applications based on the browsing history and the travel details of the commuters. In one example, the second server 104 assigns a higher rank to a gaming application than a multimedia player application, when the gaming application is selected by more commuters as compared to the multimedia player application during their rides. In another embodiment, the second server 104 may rank the set of online applications and the set of offline applications based on a historical application rating of each online and offline application that is provided by the commuters. The historical application rating of an online or offline application represents a cumulative score given by the commuters to the online or offline application. In yet another embodiment, the second server 104 may rank the set of online applications and the set of offline applications differently for different commuters. For example, for a first commuter, the second server 104 ranks the gaming application higher than the multimedia player application and for a second commuter, the second server 104 ranks the gaming application lower than the multimedia player application. In one scenario, the second server 104 may rank the set of online applications and the set of offline applications differently for different commuters based on a score provided to the set of online applications and the set of offline applications by each commuter. For example, the first commuter may have provided a score of five to the multimedia player application during his/her previous ride and the second commuter may have provided a score of two to the multimedia player application. In such a scenario, the second server 104 ranks the multimedia player application higher for the first commuter and lower for the second commuter. In another scenario, the second server 104 may rank the set of online applications and the set of offline applications based on real-time travel details of each of the commuters. In one example, the first commuter raises a ride request to go to a sports stadium and the second commuter raises another ride request to go to a movie theatre. Thus, based on the real-time travel details of the first and second commuters, the second server 104 ranks the sports application higher than the multimedia player application for the first commuter and ranks the multimedia player application higher than the sports application for the second commuter.

When a ride on the vehicle 106 begins (i.e., when a commuter who has raised the ride request boards the vehicle 106), the second server 104 selects the first subset of online applications from the set of online applications based on the ranking of the set of online applications. In one example, the second server 104 selects online applications having a rank higher than a rank threshold as the first subset of online applications. The rank threshold may be specified by the commuter travelling in the vehicle 106. In another example, the commuter may not specify the rank threshold. In such a scenario, the second server 104 selects the set of online applications as the first subset of online applications. The second server 104 transmits the first subset of online applications and the set of offline applications based on the categorization to the first device 108. The first device 108 further provides the first subset of online applications and the set of offline applications to the second device 110 based on a first input provided by the commuter. The second device 110 renders and presents the first subset of online applications and the set of offline applications to the commuter by way of the first master application 116.

The rendering of the first subset of online applications and the set of offline applications on the second device 110 by way of the first master application 116 is described in detail in conjunction with FIG. 2 and FIGS. 3A-3C.

In another embodiment, the set of offline applications are stored in the first device 108 instead of the second server 104. In such a scenario, the set of offline applications are the default applications that the first device 108 transmits to the second device 110 based on the first input provided by the commuter. In yet another embodiment, the second server 104 may transmit a first subset of offline applications to the first device 108 instead of transmitting the entire set of offline applications. A selection of the first subset of offline applications from the set of offline applications may be performed in a similar manner as performed for the first subset of online applications.

Referring now to FIG. 2, a block diagram that illustrates the first and second devices 108 and 110 of the system environment 100 of FIG. 1, in accordance with an embodiment of the present invention, is shown. The first device 108 includes a first processor 200, the first memory 202, a first transceiver 204, and a first input/output (I/O) interface 206. The first I/O interface 206 includes a first display 208. The first processor 200, the first memory 202, the first transceiver 204, and the first I/O interface 206 communicate with each other by way of a first bus 210. The second device 110 includes a second processor 212, a second memory 214, a second transceiver 216, and a second I/O interface 218. The second I/O interface 218 includes a second display 220. The second processor 212, the second memory 214, the second transceiver 216, and the second I/O interface 218 communicate with each other by way of a second bus 222.

The first processor 200 includes suitable logic, circuitry, and/or interfaces to execute instructions stored in the first memory 202. When a ride on the vehicle 106 begins, the first processor 200 receives the first subset of online applications and the set of offline applications from the second server 104 by way of the first transceiver 204. The first processor 200 processes various requests, pertaining to the selection of online applications and offline applications (i.e., the selected applications) from the first subset of online applications and the set of offline applications respectively, received from the second device 110. In one scenario, the first processor 200 receives multimedia files from the third-party servers, such as the first server 102, when the selected applications include an online application of the first subset of online applications. In another scenario, the first processor 200 retrieves multimedia files from the first memory 202, when the selected applications include an offline application of the set of offline applications. In yet another scenario, the first processor 200 retrieves the multimedia files from the first memory 202 and receives the multimedia files from the third-party servers, when the selected applications include both the online and offline applications. The first processor 200 further manages streaming of the retrieved and/or received multimedia files on to the second device 110 based on the requests. In one embodiment, when the retrieved and/or received multimedia files include audio and video components, the first processor 200 synchronizes the playback of the video component on the second device 110 with the playback of the audio component on the external device 224.

The first memory 202 includes suitable logic, circuitry, and/or interfaces that store the instructions, programs, codes, and/or scripts executable by the first processor 200. The first memory 202 stores the second set of multimedia files that are received from the second server 104.

The first transceiver 204 includes suitable logic, circuitry, and/or interfaces to transmit/receive messages and data to/from various devices, such as the first server 102, the second server 104, and the second transceiver 216. The first transceiver 204 communicates with the first server 102 and the second server 104 by way of the second communication network 114. The first transceiver 204 streams the retrieved and/or received multimedia files on to the second transceiver 216. Examples of the first transceiver 204 include, but are not limited to, an antenna, a radio frequency transceiver, a wireless transceiver, a Bluetooth transceiver, and the like. The first transceiver 204 communicates with the first server 102, the second server 104, and the second transceiver 216 using various wired and wireless communication protocols, such as TCP/IP, UDP, 2nd Generation (2G), 3rd Generation (3G), 4th Generation (4G) communication protocols, or any combination thereof.

The first I/O interface 206 includes suitable logic, circuitry, and/or interfaces to provide an output and to receive an input. In one embodiment, the first I/O interface 206 includes the first display 208 for presenting various graphical user interface (GUIs) to a driver (not shown) of the vehicle 106. The first display 208 is an interactive display device using which the driver provides various inputs. Examples of the first display 208 include, but are not limited to, a segment display, a display screen, a touchscreen, a holographic display, or any combination thereof. The first I/O interface 206 connects the first device 108 to various external devices, such as the external device 224. Examples of the first I/O interface 206 include a universal serial bus (USB) port, an Ethernet port, a microphone, a camera, and the like.

The second processor 212 includes suitable logic, circuitry, and/or interfaces to execute instructions stored in the second memory 214. The second processor 212 generates various requests based on the inputs provided by the commuter. The second processor 212 further generates multiple GUIs to be presented to the commuter during the ride on the vehicle 106. The second processor 212 further processes the multimedia files that are streamed by the first device 108 for playback.

Examples of the first and second processors 200 and 212 include an application-specific integrated circuit (ASIC) processor, a reduced instruction set computing (RISC) processor, a complex instruction set computing (CISC) processor, a field-programmable gate array (FPGA), or the like. It will be apparent to a person skilled in the art that the first and second processors 200 and 212 are compatible with multiple operating systems.

The second memory 214 includes suitable logic, circuitry, and/or interfaces that store the instructions, programs, codes, and/or scripts executable by the second processor 212. The second memory 214 stores the code or the program that is required for implementing the first master application 116.

Examples of the first and second memories 202 and 214 include, but are not limited to, a random access memory (RAM), a read-only memory (ROM), a programmable ROM (PROM), an erasable PROM (EPROM), and the like.

The second transceiver 216 includes suitable logic, circuitry, and/or interfaces to transmit/receive messages and data to/from various devices, such as the first transceiver 204. The second transceiver 216 receives the first subset of online applications and the set of offline applications from the first transceiver 204, when the ride begins. The second transceiver 216 further transmits the requests generated by the second processor 212 to the first transceiver 204. The second transceiver 216 further receives the multimedia files associated with the selected applications from the first transceiver 204. Examples of the second transceiver 216 include, but are not limited to, an antenna, a radio frequency transceiver, a wireless transceiver, or a Bluetooth transceiver. The second transceiver 216 communicates with the first transceiver 204 using various wired and wireless communication protocols, such as TCP/IP, UDP, 2G, 3G, 4G communication protocols, or any combination thereof.

The second I/O interface 218 includes suitable logic, circuitry, and/or interfaces to provide an output to the commuter and to receive an input from the commuter. In one embodiment, the second I/O interface 218 includes the second display 220 for presenting the GUIs generated by the second processor 212 to the commuter travelling in the vehicle 106. The second display 220 is an interactive display device using which the commuter provides the inputs. Examples of the second display 220 include, but are not limited to, a segment display, a display screen, a touchscreen, a holographic display, or any combination thereof. Examples of second I/O interface 218 include a universal serial bus (USB) port, an Ethernet port, a microphone, a camera, and the like.

The external device 224 is installed in the vehicle 106. In one embodiment, the external device 224 is an audio output device, such as speakers, headphones, installed in the vehicle 106 to output audio data. In one example, the audio data is an audio component of the multimedia files that are rendered on the second display 220. In another example, the audio data is an audio message for navigation guidance to the driver.

Figure 3A:
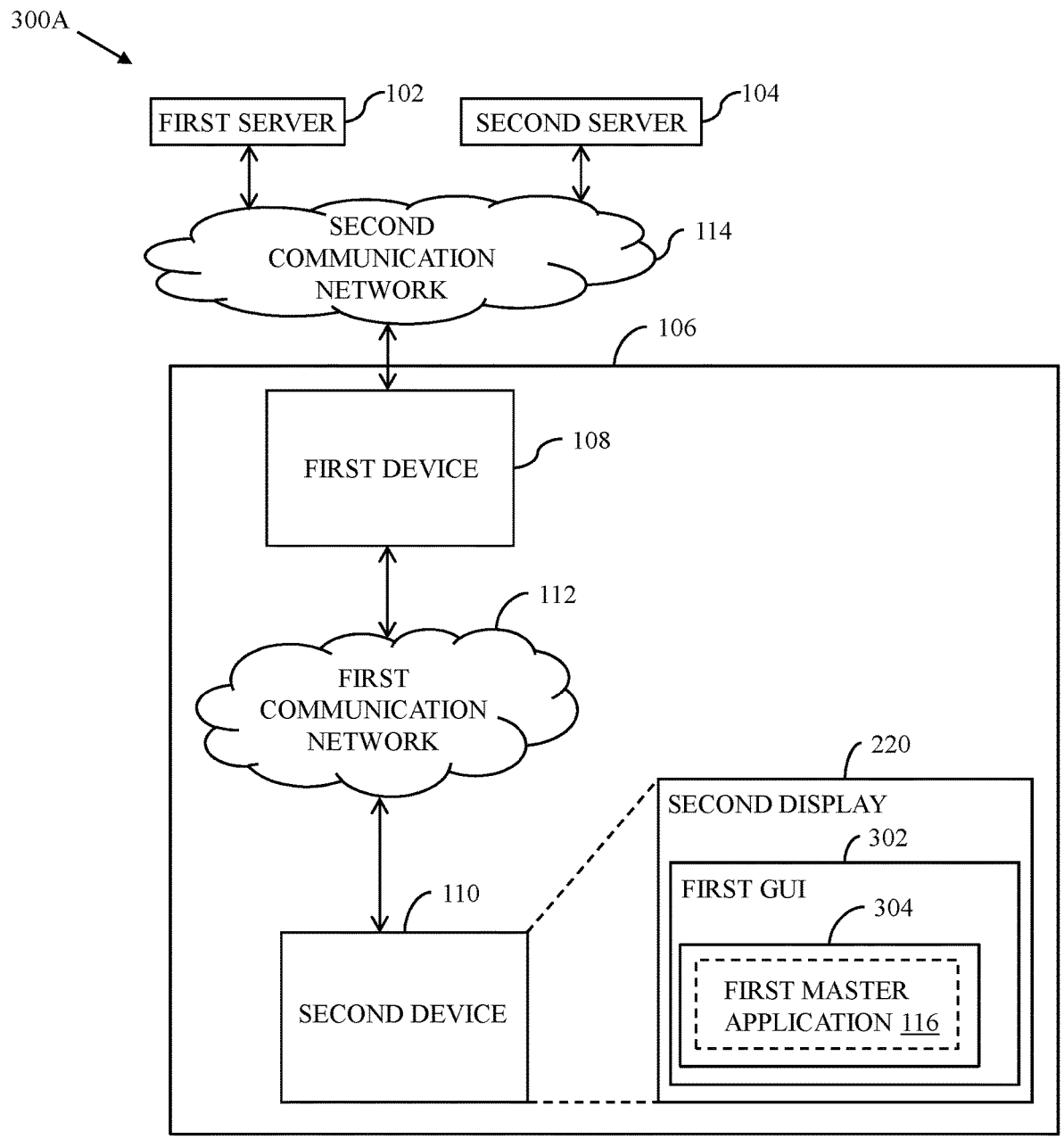
FIGS. 3A-3C illustrate exemplary scenarios for presenting various graphical user interfaces (GUIs) on the second device of FIG. 1 for providing in-vehicle services to commuters, in accordance with an embodiment of the present invention.
Figure 3B:
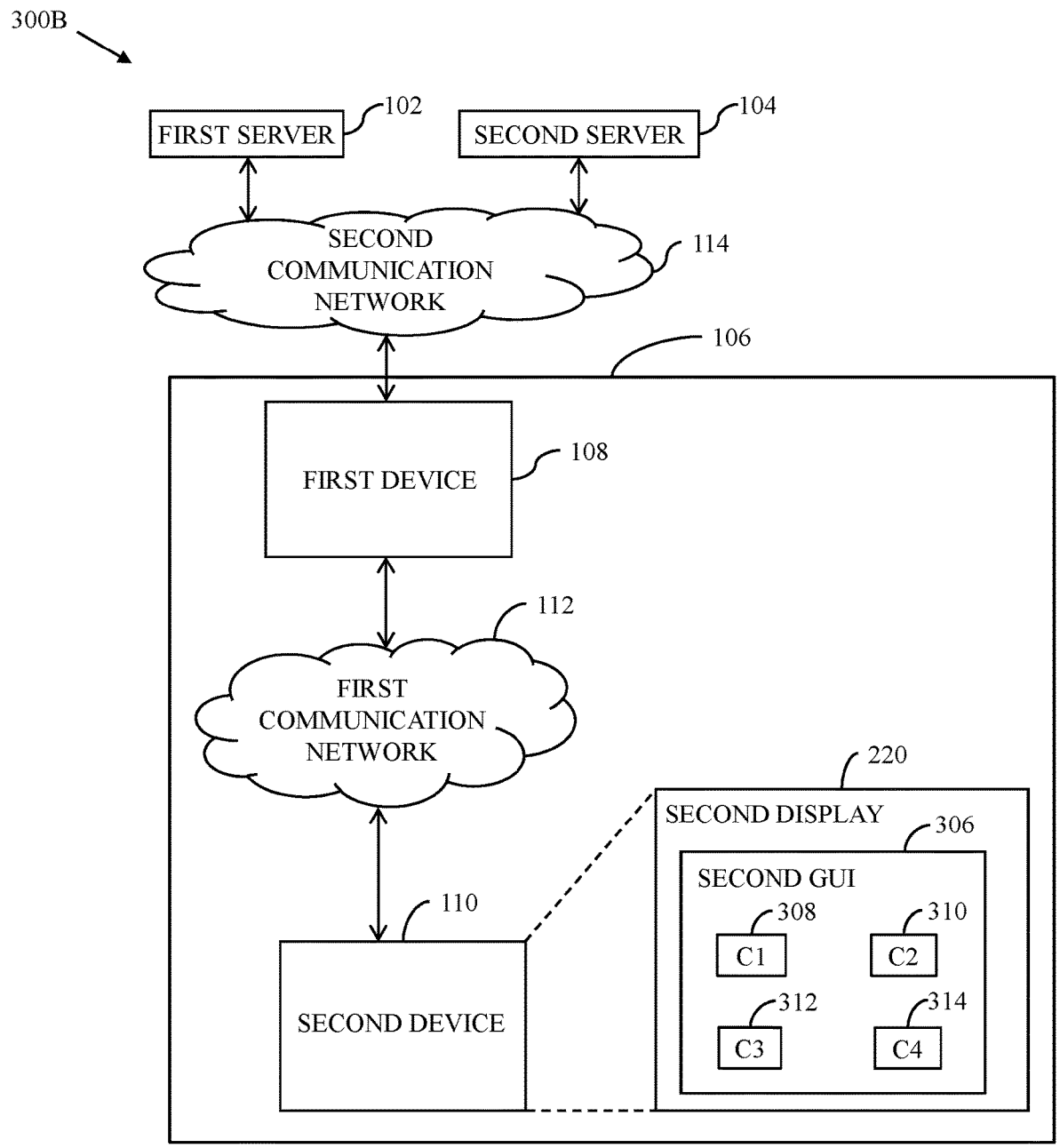
Figure 3C:
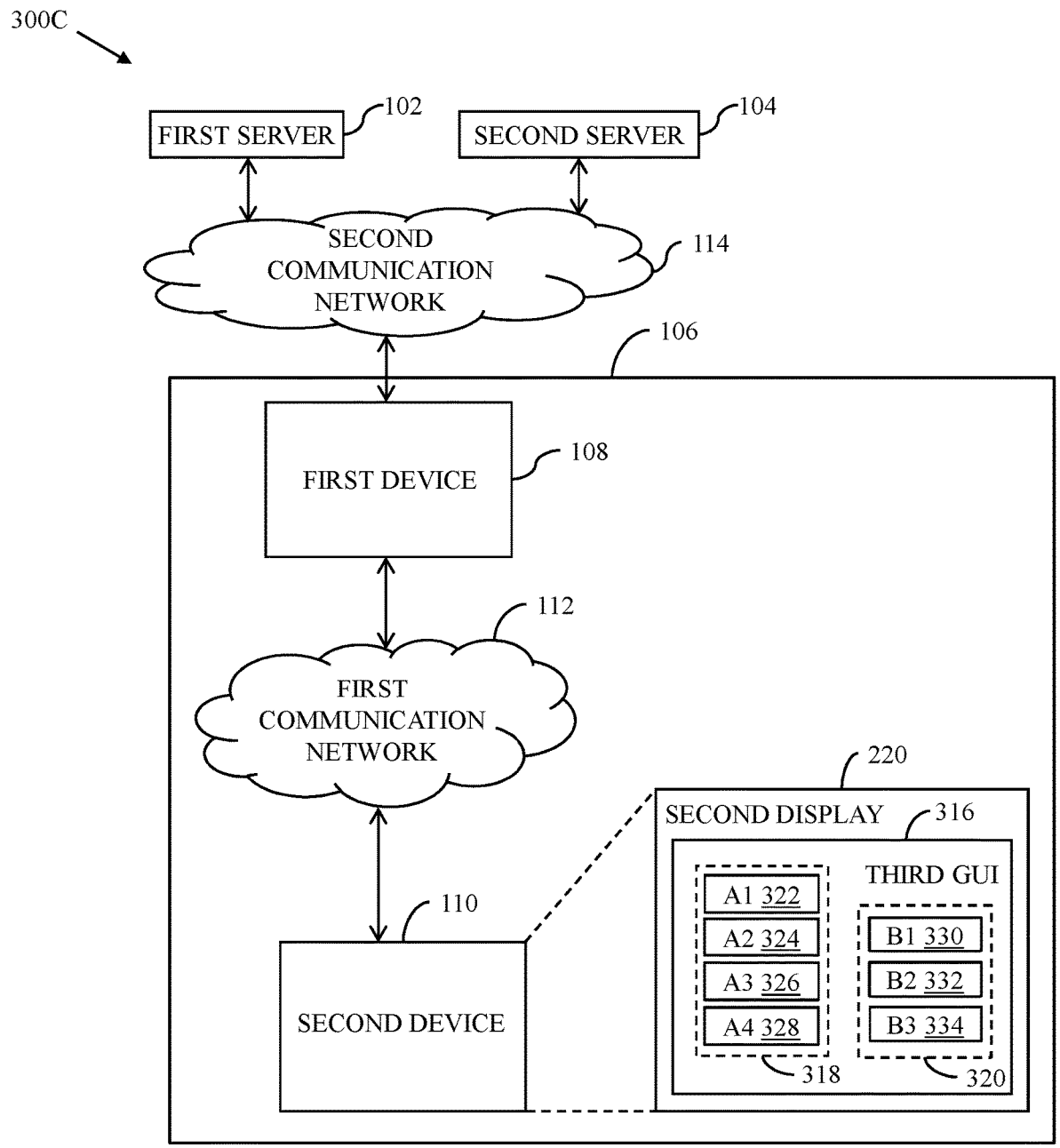

The rendering of the first subset of online applications and the set of offline applications by the elements of the first and second devices 108 and 110 is explained in detail in conjunction with FIGS. 3A-3C.

Referring now to FIGS. 3A-3C, exemplary scenarios 300A-300C for presenting various GUIs on the second device 110 of FIG. 1 for providing in-vehicle services to commuters to the commuters, in accordance with an embodiment of the present invention, are shown.

With reference to FIG. 3A, the exemplary scenario 300A illustrates the first and second servers 102 and 104, the first and second devices 108 and 110 included in the vehicle 106, and the first and second communication networks 112 and 114. The exemplary scenario 300A further illustrates the second display 220. The second processor 212 generates a first GUI 302, which is rendered on the second display 220. The first GUI 302 may be designed using a GUI builder software such as Atmel Qtouch®, Altia Design®, GrabCAD®, or the like. The first GUI 302 includes a first icon 304 for the first master application 116.

When the ride on the vehicle 106 begins (i.e., when a commuter who has raised the ride request boards the vehicle 106), the second server 104 selects the first subset of online applications from the set of online applications, and transmits the first subset of online applications and the set of offline applications to the first device 108. In one embodiment, the second server 104 selects the first subset of online applications from the set of online applications based on the ranking and the categorization of the set of online applications. The first transceiver 204 receives the first subset of online applications and the set of offline applications. The first transceiver 204 provides the set offline applications and the first subset of online applications to the second transceiver 216. The first master application 116 then hosts the received the set offline applications and the first subset of online applications.

When the second display 220 presents the first GUI 302 to the commuter, the commuter may provide the first input to select the first icon 304. By selecting the first icon 304, the commuter selects the first master application 116. The selection of the first master application 116 redirects the control from the first GUI 302 to a second GUI 306 as illustrated in FIG. 3B.

With reference to FIG. 3B, the exemplary scenario 300B illustrates the second GUI 306 rendered on to the second display 220. The second GUI 306 includes multiple icons, such as second through fifth icons 308-314, for presenting the categories into which the first subset of online applications and the set of offline applications are categorized by the second server 104. The second icon 308 represents a first category C1, the third icon 310 represents a second category C2, the fourth icon 312 represents a third category C3, and the fifth icon 314 represents a fourth category C4.

When the second display 220 presents the second GUI 306 to the commuter, the commuter may provide a second input to select one of the second through fifth icons 308-314. For example, the commuter selects the third icon 310 by clicking on it. By selecting one of the second through fifth icons 308-314, the commuter selects the corresponding category. For example, by selecting the third icon 310, the commuter selects the second category C2. The selection of one of the second through fifth icons 308-314, redirects the control from the second GUI 306 to a third GUI 316 as illustrated in FIG. 3C.

With reference to FIG. 3C, the exemplary scenario 300C illustrates the third GUI 316 rendered on to the second display 220. The third GUI 316 includes first and second sets of icons 318 and 320. The first set of icons 318 includes sixth through ninth icons 322-328 and the second set of icons 320 include tenth through twelfth icons 330-334. The first set of icons 318 represents offline applications of the set of offline applications and the second set of icons 320 represents online applications of the first subset of online applications that fall under the category selected by the commuter. The sixth through ninth icons 322-328 represent first through fourth offline applications A1-A4, respectively, of the set of offline applications that fall under the selected category. The tenth through twelfth icons 330-334 represent first through third online applications B1-B3, respectively, of the first subset of online applications that fall under the selected category. In one example, the commuter may have selected the second category C2 (i.e., the movie category) by providing the second input. Thus, the first set of icons 318 represents the offline applications that fall under the second category C2 and the second set of icons 320 represents the online applications that fall under the second category C2. In other words, if the commuter selects the movie category presented by the second GUI 306 all applications presented on the third GUI 316 are applications related to the movie category.

The first through fourth offline applications A1-A4 and the first through third online applications B1-B3 are ranked. In one example, the first through fourth offline applications A1-A4 and the first through third online applications B1-B3 are presented in a descending order of the ranks assigned by the second server 104. In another example, the first through fourth offline applications A1-A4 and the first through third online applications B1-B3 are presented in an ascending order of the ranks assigned by the second server 104.

When the second display 220 presents the third GUI 316 to the commuter, the commuter may provide at least one of a third input or a fourth input. The commuter provides the third input to select one icon from the first set of icons 318 and/or the fourth input to select one icon from the second set of icons 320. In one example, the commuter provides the third input and selects the seventh icon 324. In another example, the commuter provides the fourth input and selects the eleventh icon 332. Based on the selection of one icon from the first and second sets of icons 318 and 320, the corresponding application is selected. For example, when the commuter selects the seventh icon 324, the second offline application A2 is selected. In another example, when the commuter selects the eleventh icon 332, the second online application B2 is selected. In other words, the commuter provides at least one of the third or fourth inputs by way of the offline applications and the online applications represented by the first and second sets of icons 318 and 320, respectively.

In the scenario, when the commuter provides the third input and selects one offline application from the first through fourth offline applications A1-A4, the second processor 212 generates a first request for receiving multimedia files that are associated with the selected offline application. The first request is indicative of the selected offline application. The second transceiver 216 transmits the first request to the first transceiver 204 by way of the first communication network 112. Based on the first request, the first processor 200 retrieves the second set of multimedia files from the first memory 202. The first processor 200 further identifies the multimedia files from the second set of multimedia files that are associated with the selected offline application. For example, when the selected offline application is a multimedia player application that plays videos, the first processor 200 identifies video files from the second set of multimedia files. Based on the identification of the multimedia files that are associated with the selected offline application, the first processor 200 instructs the first transceiver 204 to stream the identified multimedia files on to the second device 110 one after the other by way of the first communication network 112. In one embodiment, prior to the streaming of the multimedia files on to the second device 110, the first processor 200 provides a first list of the identified multimedia files to the second processor 212. The second processor 212 presents the first list to the commuter by way of the second display 220. In such a scenario, the commuter may select multimedia files from the first list that he/she is interested in. The second processor 212 communicates information pertaining to the selection of the multimedia files to the first processor 200. Based on the received information, the first processor 200 creates a first playlist including the multimedia files selected by the commuter. The first processor 200 then streams the selected multimedia files on to the second device 110 based on the first playlist. The streamed multimedia files are then rendered through the selected offline application on the second display 220 and are thus presented to the commuter.

In one embodiment, the commuter provides control inputs, such as play, pause, stop, rewind, or the like, to control playback of the streamed multimedia files. The second processor 212 communicates control commands, such as play command, pause command, stop command, rewind command, or the like, to the first processor 200. The first processor 200 controls the streaming of the multimedia files based on the control commands. For example, when the commuter provides a control input to pause the playback of a multimedia file, the first processor 200 receives the pause command from the second processor 212. In response to the pause command, the first processor 200 pauses the streaming of the multimedia file.

In the scenario, when the commuter provides the fourth input and selects one online application from the first through third online applications B1-B3, the second processor 212 generates a second request for receiving multimedia files that are associated with the selected online application. The second request is indicative of the selected online application. The second transceiver 216 transmits the second request to the first transceiver 204 by way of the first communication network 112. The first transceiver 204 further transmits the second request to a third-party server that is associated with the selected online application. For example, the second request indicates the selection of the first online application B1 associated with the first server 102. In such a scenario, the first transceiver 204 transmits the second request to the first server 102.

In one embodiment, the first server 102 transmits the first set of multimedia files to the first device 108, based on the second request and the first processor 200 then streams the selected multimedia files on to the second device 110. In another embodiment, the first server 102 provides a second list of the first set of multimedia files associated with the first online application B1 to the first processor 200 over the second communication network 114. The first processor 200 provides the second list to the second processor 212. The second processor 212 presents the second list to the commuter by way of the second display 220. The commuter may select multimedia files from the second list that he/she is interested in. The second processor 212 communicates information pertaining to the selection of the multimedia files to the first processor 200 and the first processor 200 communicates the information pertaining to the selection of the multimedia files to the first server 102. Based on the received information, the first server 102 creates a second playlist including the multimedia files selected by the commuter. The first server 102 then transmits the selected multimedia files included in the second playlist to the first processor 200. The first processor 200 then streams the multimedia files on to the second device 110 based on the second playlist. The streamed multimedia files are then rendered through the first online application B1 on the second display 220 and are thus presented to the commuter.

In one embodiment, when the ride of the commuter ends, the first processor 200 automatically stops the streaming of the multimedia files on to second device 110 and determines a playback status of the streamed the multimedia files. The playback status indicates a time-stamp of a multimedia file that was being streamed on the second device 110, when the ride ended. For example, a multimedia file that was being streamed on the second device 110 is a 40 minutes video file. When the ride ended, the playback status of the video file was 00:32:15. The playback status 00:32:15 indicates that the video file was streamed up to 32 minutes 15 seconds. The first processor 200 transmits the playback status to the second server 104 and updates the profile of the commuter by including the playback status. In one embodiment, when the commuter rides in the vehicle 106 or any other vehicle deployed by the transportation service provider of the vehicle 106 again, the first processor 200 retrieves the playback status from the commuter profile of the commuter and resumes the playback based on the playback status.

In one embodiment, the second processor 212 may not categorize the set of online applications and the set of offline applications. In such a scenario, when the commuter provides the first input to select the first master application 116, the control from the first GUI 302 is redirected to the third GUI 316. The first set of icons 318 and the second set of icons 320 in the third GUI 316 then represent the first subset of online applications and the set of offline application that are ranked.

In one embodiment, when a third-party content provider updates a corresponding online application, the corresponding application is updated in the second server 104. For example, the first third-party content provider may update the first online application B1. Based on the update by the first third-party content provider, the first online application B1 stored in the second server 104 is updated. Hence, a requirement of manually updating the first subset of online applications on the second device 110 is eliminated.

Thus, the system environment 100 is used to offer personalized multimedia content to the commuters, as the first subset of online applications and the set of offline applications rendered by way of the first master application 116 are ranked and categorized. Further, the third-party content providers can develop online applications that are hosted by the first master application 116 for offering corresponding multimedia files to the commuters. Thus, the first master application 116 serves as a common platform between transportation service provider who has deployed the vehicle 106 and the third-party content providers. The system environment 100 further ensures a pleasant ride experience for the commuters.

Figure 4A:
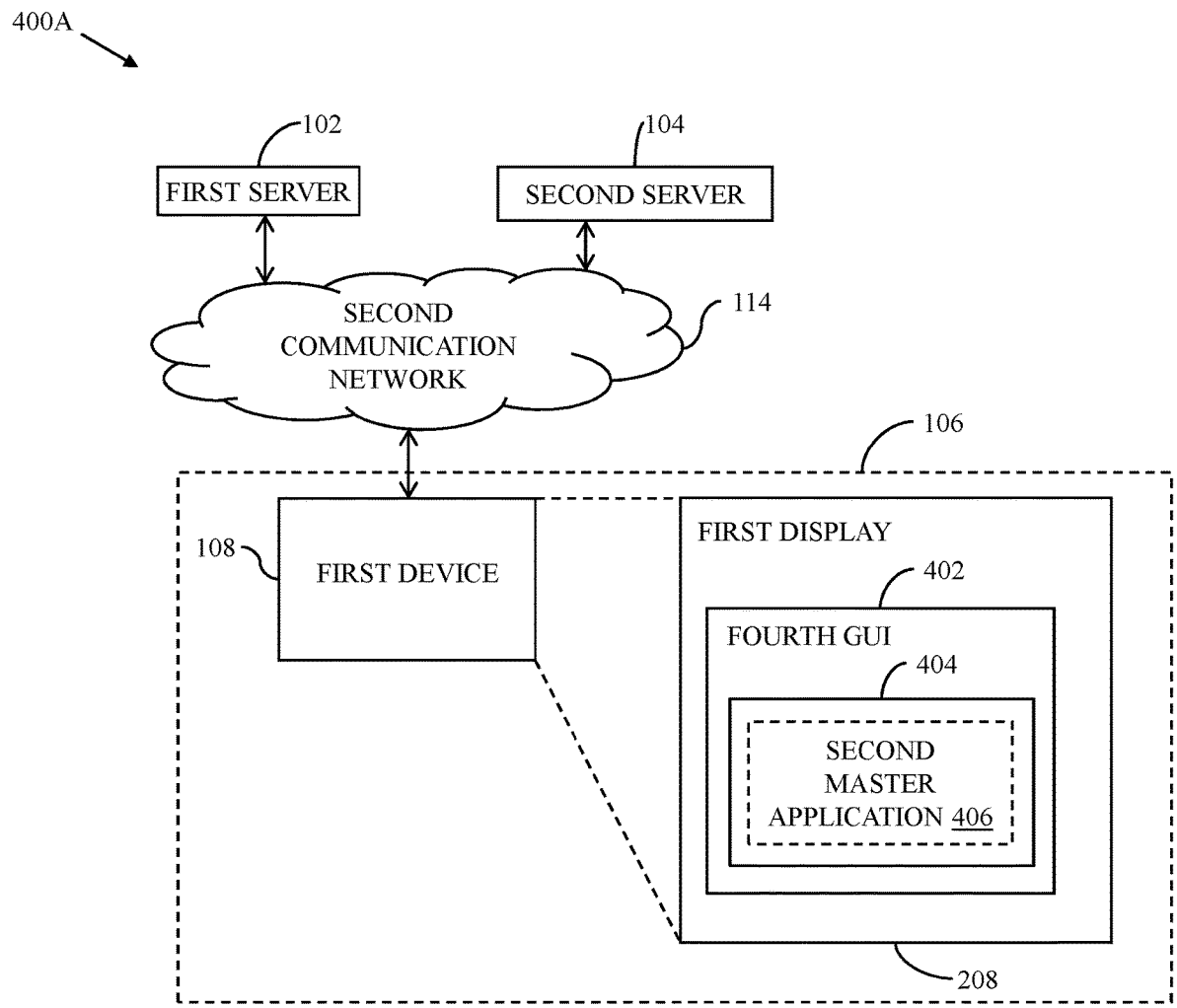
FIGS. 4A and 4B illustrate exemplary scenarios for presenting various GUIs on the first device of FIG. 1 for providing in-vehicle services to a driver, in accordance with an embodiment of the present invention.
Figure 4B:
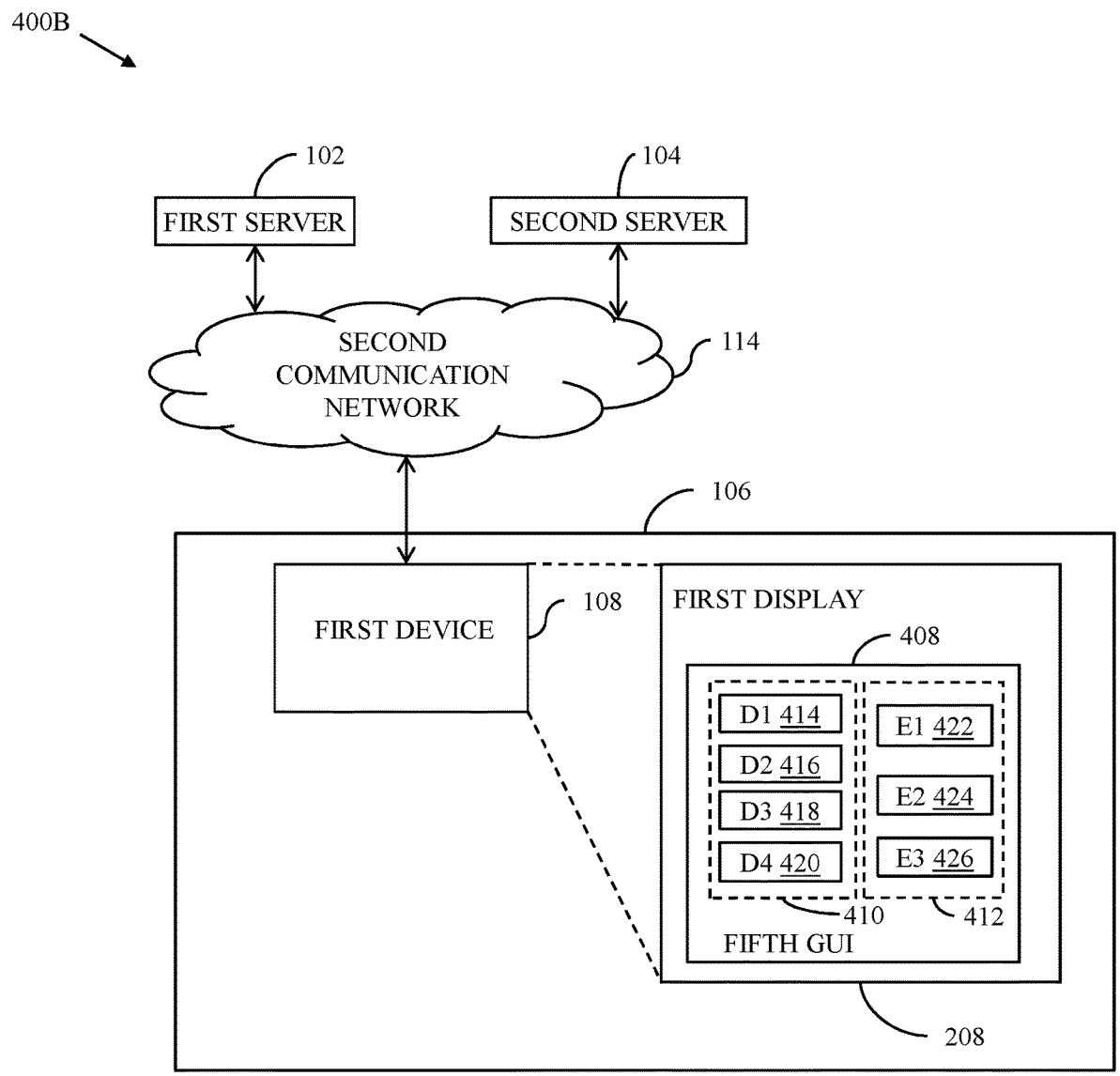

Referring now to FIGS. 4A and 4B, exemplary scenarios 400A-400C for presenting various GUIs on the first device 108 of FIG. 1 for providing in-vehicle services to the driver of vehicle 106, in accordance with an embodiment of the present invention, are shown.

With reference to FIG. 4A, the exemplary scenario 400A illustrates the first and second servers 102 and 104, the first device 108 included in the vehicle 106, and the second communication network 114. The exemplary scenario 400A further illustrates the first display 208. The second processor 212 generates a fourth GUI 402, which is rendered on the first display 208. The fourth GUI 402 includes a thirteenth icon 404 for a second master application 406. The second master application 406 is installed in the first device 108. The first memory 202 stores a code or a program by way of which the first processor 200 implements the second master application 406. The second master application 406 is accessible to the driver of the vehicle 106.

When the first display 208 presents the fourth GUI 402 to the driver, the driver may provide a fifth input to select the thirteenth icon 404. By selecting the thirteenth icon 404, the driver selects the second master application 406. The selection of the second master application 406 redirects the control from the fourth GUI 402 to a fifth GUI 408 as illustrated in FIG. 4B.

With reference to FIG. 4B, the exemplary scenario 400B illustrates the fifth GUI 408 rendered on the first display 208. The fifth GUI 408 includes third and fourth sets of icons 410 and 412. The third set of icons 410 includes fourteenth through seventeenth icons 414-420 and the fourth set of icons 412 includes eighteenth through twentieth icons 422-426. The fourteenth through seventeenth icons 414-420 represent a second subset of offline applications D1-D4 of the set of offline applications that are of use to the driver. The driver may use the second subset of offline applications to acquire information pertaining to the vehicle 106 that is stored in the first memory 202. The information may be stored in the form of multimedia files, such as editable PDF documents, editable word documents, images, and the like. The information may include fuel filling records, mileage record, fuel consumption record, maintenance records of different components of the vehicle 106, or the like. The eighteenth through twentieth icons 422-426 represent a second subset of online applications E1-E3. The second server 104 may transmit the second subset of online applications E1-E3 by selecting from the set of online applications. The second subset of online applications E1-E3 includes online applications that are of use to the driver. In one embodiment, the second server 104 selects the second subset of online applications E1-E3 based on instructions of the transportation service provider. Examples of the second subset of online applications E1-E3 include a navigation application, a traffic guideline application, or the like. The driver may provide one of a sixth input or a seventh input to select one icon from the third set of icons 410 or one icon from the fourth sets of icons 412, respectively.

Based on the sixth input, one offline application from the second subset of offline applications D1-D4 is selected. Based on the selection of the offline application, the first processor 200 retrieves a multimedia file from the first memory 202 that is associated with the selected offline application and renders on the first display 208 for presenting to the driver. Based on the seventh input, one online application from the second subset of online applications E1-E3 is selected. Based on the selection of the online application, the first processor 200 receives a multimedia file from the second server 104 that is associated with the selected online application and renders on the first display 208 for presenting to the driver. In one embodiment, the second subset of offline applications D1-D4 and the second subset of online applications E1-E3 may be categorized into different categories.

It will be apparent to one skilled in the art that the above-mentioned exemplary scenarios 300A-300C, and 400A and 400B are for illustrative purpose and should not be construed to limit the scope of invention.

Thus, the system environment 100 is not only useful for the commuters but also provides multimedia files of interest to the driver of the vehicle 106. Further, the second subset of online applications E1-E3 and the second subset of offline applications D1-D4 that are presented to the driver are selected based on instructions of the transportation service provider, thereby preventing any misuse of the first device 108 by the driver of the vehicle 106 during the ride.

Figure 5:
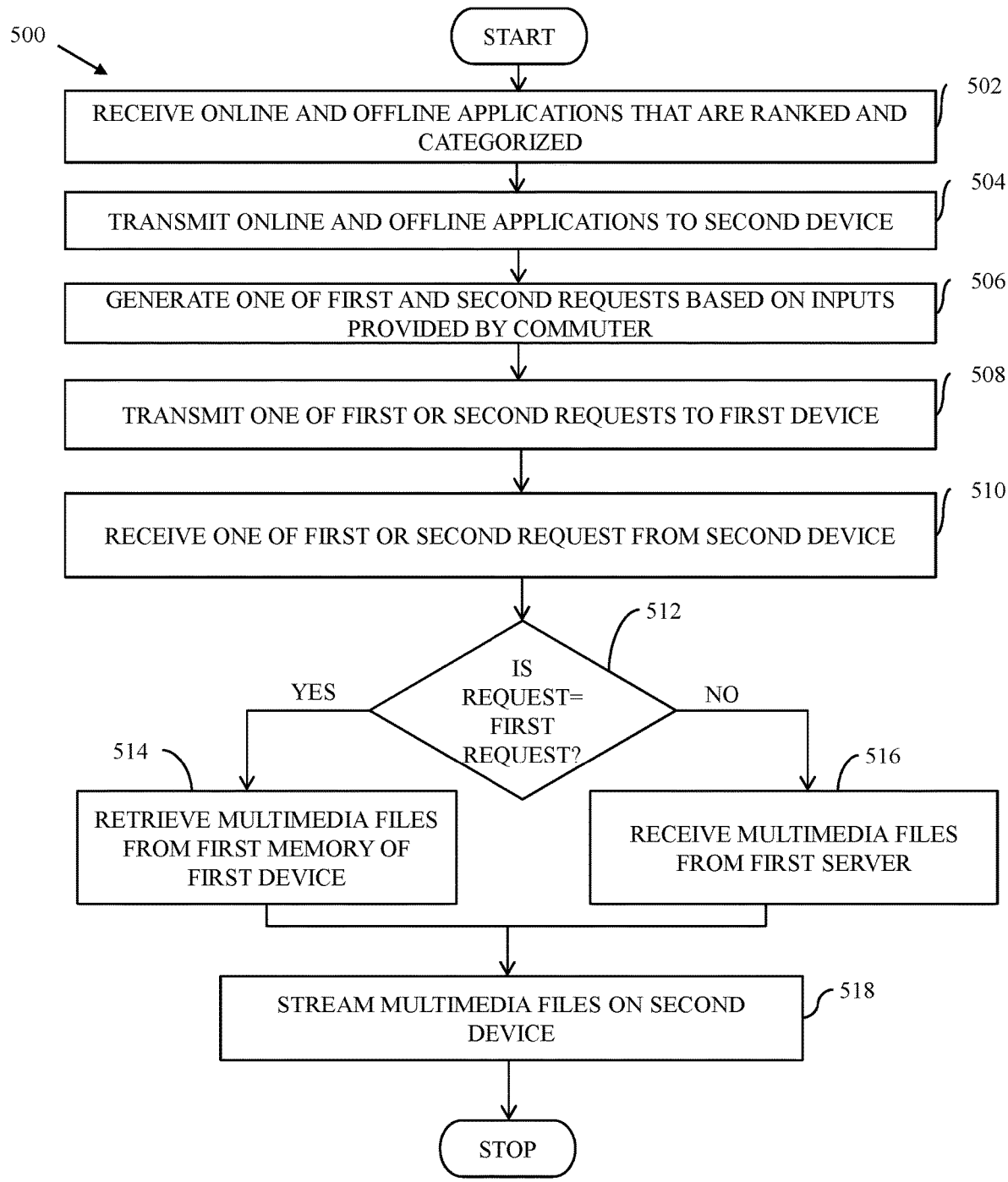
FIG. 5 illustrates a flow chart of a method for providing in-vehicle services to commuters in the system environment of FIG. 1, in accordance with an embodiment of the present invention.

Referring now to FIG. 5, a flowchart 500 that illustrates a method for providing in-vehicle services to commuters in the system environment 100, in accordance with an embodiment of the present invention, is shown.

At step 502, the first device 108 receives the first subset of online applications and the set of offline applications, from the second server 104 by way of the second communication network 114. The first subset of online applications and the set of offline applications are ranked and categorized by the second server 104.

At step 504, the first device 108 transmits the first subset of online applications and the set of offline applications to the second device 110, by way of the first communication network 112. The first device 108 transmits the first subset of online applications and the set of offline applications to the second device 110, when the commuter selects the first master application 116 installed on the second device 110 during a ride in the vehicle 106.

At step 506, the second device 110 generates one of the first request or the second request based on the inputs provided by the commuter. The commuter may provide the inputs by selecting one application from the first subset of online applications and the set of offline applications rendered on the second display 220 by way of the first master application 116. At step 508, the second device 110 transmits one of the first or second request to the first device 108 over the first communication network 112. At step 510, the first device 108 receives one of the first or second request from the second device 110 over the first communication network 112.

At step 512 the first device 108 determines whether the received request is the first request or the second request. If at step 512 it is determined that the received request is the first request, step 514 is performed by the first device 108. Else, the first device 108 performs step 516.

At step 514, the first device 108 retrieves multimedia files from the first memory 202 based on the first request and performs step 518. At step 516, the first device 108 receives multimedia files from the first server 102 based on the second request by way of the second communication network 114 and performs step 518. At step 518, the first device 108 streams the retrieved/received multimedia files on to the second device 110 by way of the first communication network 112. The retrieved/received multimedia files are rendered on the second display 220.

Figure 6:
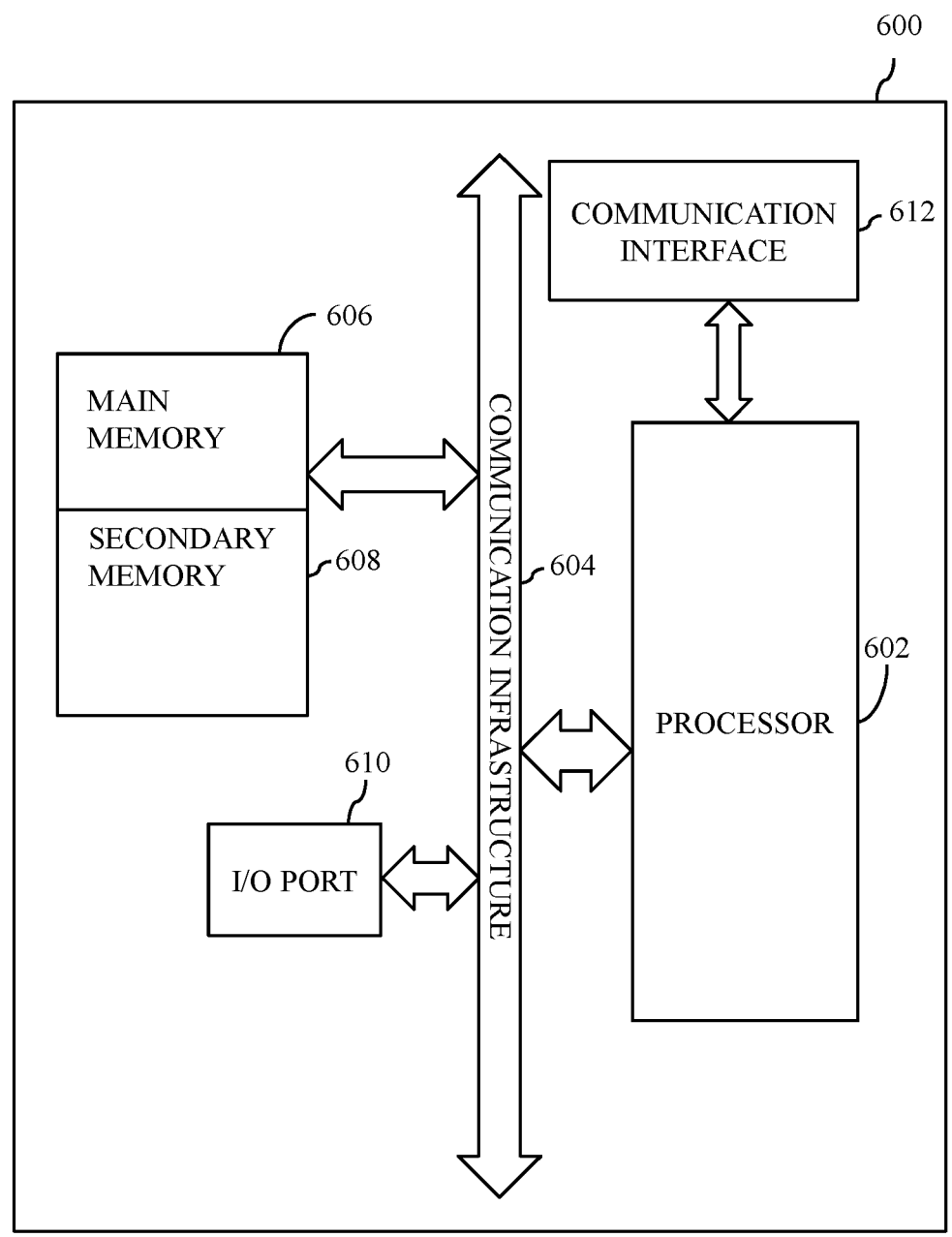
FIG. 6 illustrates a block diagram of a computer system for providing in-vehicle services to commuters in the system environment of FIG. 1, in accordance with an embodiment of the present invention.

Referring now to FIG. 6, a block diagram of a computer system 600 for providing in-vehicle services to commuters in the system environment 100, in accordance with an embodiment of the present invention, is shown. An embodiment of present invention, or portions thereof, may be implemented as computer readable code on the computer system 600. In one example, the first and second servers 102 and 104, and the first and second devices 108 and 110 of FIG. 1 may be implemented in the computer system 600 using hardware, software, firmware, non-transitory computer readable media having instructions stored thereon, or a combination thereof and may be implemented in one or more computer systems or other processing systems. Hardware, software, or any combination thereof may embody modules and components used to implement the method of FIG. 5.

The computer system 600 includes a processor 602 that may be a special purpose or a general purpose processing device. The processor 602 may be a single processor, multiple processors, or combinations thereof. The processor 602 may have one or more processor "cores." Further, the processor 602 may be connected to a communication infrastructure 604, such as a bus, a bridge, a message queue, the first communication network 112, multi-core message-passing scheme, and the like. The computer system 600 further includes a main memory 606 and a secondary memory 608. Examples of the main memory 606 may include random access memory (RAM), read-only memory (ROM), and the like. The secondary memory 608 may include a hard disk drive or a removable storage drive (not shown), such as a floppy disk drive, a magnetic tape drive, a compact disc, an optical disk drive, a flash memory, and the like. Further, the removable storage drive may read from and/or write to a removable storage device in a manner known in the art. In an embodiment, the removable storage unit may be a non-transitory computer readable recording media.

The computer system 600 further includes an I/O port 610 and a communication interface 612. The I/O port 610 includes various input and output devices that are configured to communicate with the processor 602. Examples of the input devices may include a keyboard, a mouse, a joystick, a touchscreen, a microphone, and the like. Examples of the output devices may include a display screen, a speaker, headphones, and the like. The communication interface 612 may be configured to allow data to be transferred between the computer system 600 and various devices that are communicatively coupled to the computer system 600. Examples of the communication interface 612 may include a modem, a network interface, i.e., an Ethernet card, a communications port, and the like. Data transferred via the communication interface 612 may correspond to signals, such as electronic, electromagnetic, optical, or other signals as will be apparent to a person skilled in the art. The signals may travel via a communications channel, which may be configured to transmit the signals to devices that are communicatively coupled to the computer system 600. Examples of the communication channel may include, but are not limited to, cable, fiber optics, a phone line, a cellular phone link, a radio frequency link, a wireless link, and the like.

Computer program medium and computer usable medium may refer to memories, such as the main memory 606 and the secondary memory 608, which may be a semiconductor memory such as dynamic RAMs. These computer program mediums may provide data that enables the computer system 600 to implement the method illustrated in FIG. 5. In an embodiment, the present invention is implemented using a computer implemented application, such as the first and second master applications 116 and 406. The computer implemented application may be stored in a computer program product and loaded into the computer system 600 using the removable storage drive or the hard disc drive in the secondary memory 608, the I/O port 610, or the communication interface 612.

A person having ordinary skill in the art will appreciate that embodiments of the disclosed subject matter can be practiced with various computer system configurations, including multi-core multiprocessor systems, minicomputers, mainframe computers, computers linked or clustered with distributed functions, as well as pervasive or miniature computers that may be embedded into virtually any device. For instance, at least one processor such as the processor 602 and a memory such as the main memory 606 and the secondary memory 608 may be used to implement the above described embodiments. Further, the operations may be described as a sequential process, however some of the operations may in fact be performed in parallel, concurrently, and/or in a distributed environment, and with program code stored locally or remotely for access by single or multiprocessor machines. In addition, in some embodiments the order of operations may be rearranged without deviating from the scope of present invention.

Techniques consistent with the present invention provide, among other features, systems and methods for providing in-vehicle entertainment services. Unless stated otherwise, terms such as "first" and "second" are used to arbitrarily distinguish between the elements such terms describe. Thus, these terms are not necessarily intended to indicate temporal or other prioritization of such elements. While various exemplary embodiments of the disclosed system and method have been described above it should be understood that they have been presented for purposes of example only, not limitations. It is not exhaustive and does not limit the invention to the precise form disclosed. Modifications and variations are possible in light of the above teachings or may be acquired from practicing of the invention, without departing from the breadth or scope.

What is claimed is:

1. A method for providing in-vehicle services, the method comprising:

receiving, by a first device of a vehicle from a second device of the vehicle over a first communication network, an application selection input corresponding to selection of a first master application on the second device by a commuter in the vehicle, wherein the first master application is for hosting a set of online applications and a set of offline applications selected by a first server, and wherein the set of online applications and the set of offline applications are associated with a plurality of categories, and wherein the set of offline applications and the set of online applications are retrieved, by the first device, from a plurality of applications stored on the first server based on ranking and categorization of the plurality of applications by way of a second communication network, wherein the set of offline applications and the set of online applications include at least a first application and a second application, respectively, and wherein the first device provides the set of offline applications and the set of online applications to the first master application, and wherein the set of online applications is selected based on a rank threshold specified by the commuter travelling in the vehicle;

rendering, by the first device on a display of the second device, the plurality of categories into which the set of online applications and the set of offline applications are categorized by the first server;

receiving, by the first device from the second device, a category selection input corresponding to selection of a category from the plurality of categories by the commuter;

rendering, by the first device on the display of the second device, online applications selected from the set of online applications and offline applications selected from the set of offline applications, wherein the online applications and the offline applications are selected based on the selected category by the commuter;

receiving at least one of a first or a second request by the first device from the second device, wherein the second device transmits at least one of the first or the second request based on at least one of a first input or a second input, respectively, wherein the first or the second input is received by way of the first or the second application selected by the commuter from the offline applications or the online applications, respectively, and wherein the first and second applications are rendered by the first master application installed on the second device;

retrieving, by the first device, one or more multimedia files including at least a first multimedia file from the first server over the second communication network, wherein the first device stores the one or more multimedia files in a first memory;

retrieving, by the first device, at least one of the first multimedia file from the first memory of the first device in response to the first request, or a second multimedia file from a second server in response to the second request by way of the second communication network; and streaming, by the first device, at least one of the first multimedia file or the second multimedia file on the second device by way of the first communication network.

2. The method of claim 1, wherein the first and second inputs are provided by the commuter travelling in the vehicle.

3. The method of claim 1, wherein the first server performs the ranking of the plurality of applications, based on at least one of commuter rating, browsing history, or travel data of one or more commuters.

4. The method of claim 1, wherein the first server performs the categorization of the plurality of applications into one or more categories of the plurality of categories, based on a content type of a plurality of multimedia files associated with the plurality of applications, respectively.

5. The method of claim 1, further comprising receiving, by the first device, at least one of a third or a fourth input by way of a third or a fourth application, respectively, wherein the third and fourth applications are rendered by a second master application installed on the first device.

6. The method of claim 5, further comprising retrieving, by the first device, at least one of a third multimedia file from the first memory of the first device in response to the third input or a fourth multimedia file from the second server in response to the fourth input.

7. The method of claim 5, wherein the third and fourth inputs are provided by a driver of the vehicle.

8. A system for providing in-vehicle services, the system comprising:
a first device comprising:
a memory configured to store at least a first multimedia file; and
a processor that communicates with the memory, wherein the processor is configured to:

receive, from a second device of a vehicle over a first communication network, an application selection input corresponding to selection of a first master application on the second device by a commuter in the vehicle, wherein the first master application is for hosting a set of online applications and a set of offline applications selected by a first server, and wherein the set of online applications and the set of offline applications are associated with a plurality of categories, and wherein the set of offline applications and the set of online applications are retrieved from a plurality of applications stored on the first server based on ranking and categorization of the plurality of applications by way of a second communication network, wherein the set of offline applications and the set of online applications includes at least a first application and a second application, respectively, and wherein the set of online applications is selected based on a rank threshold specified by the commuter travelling in the vehicle;

render, on a display of the second device, the plurality of categories into which the set of online applications and the set of offline applications are categorized by the first server;

receive, from the second device, a category selection input corresponding to selection of a category from the plurality of categories by the commuter;

render, on the display of the second device, online applications selected from the set of online applications and offline applications selected from the set of offline applications, wherein the online applications and the offline applications are selected based on the selected category by the commuter;

receive at least one of a first or a second request from the second device, wherein the second device transmits at least one of the first or the second request based on at least one of a first input or a second input, respectively, wherein the first or the second input is received by way of the first or the second application selected by the commuter from the offline applications or the online applications, respectively, and wherein the first and second applications are rendered by the first master application installed on the second device;

retrieve one or more multimedia files including at least the first multimedia file from the first server over the second communication network, wherein the one or more multimedia files are stored in the memory;

retrieve at least one of the first multimedia file from the memory of the first device in response to the first request, or a second multimedia file from a second server in response to the second request by way of the second communication network; and stream at least one of the first multimedia file or the second multimedia file on the second device by way of the first communication network.

9. The system of claim 8, wherein the processor is further configured to:
receive at least one of a third or a fourth input by way of a third or a fourth application, respectively, wherein the third and fourth applications are rendered by a second master application installed on the first device; and retrieve at least one of a third multimedia file from the memory in response to the third input or a fourth multimedia file from the second server in response to the fourth input by way of the second communication network, wherein the third and fourth inputs are provided by a driver of the vehicle.

10. A system for providing in-vehicle services, the system comprising:
a first device comprising:
   a memory configured to store at least a first multimedia file; and
   a processor that communicates with the memory, wherein the processor is configured to:
      receive, from a second device of a vehicle over a first communication network, an application selection input corresponding to selection of a first master application on the second device by a commuter in the vehicle, wherein the first master application is for hosting a set of online applications and a set of offline applications selected by a first server, and wherein the set of online applications and the set of offline applications are associated with a plurality of categories, and
         wherein the set of online applications is selected based on a rank threshold specified by the commuter travelling in the vehicle;
      render, on a display of the second device, the plurality of categories into which the set of online applications and the set of offline applications are categorized by the first server;
      receive, from the second device, a category selection input corresponding to selection of a category from the plurality of categories by the commuter;
      render, on the display of the second device, online applications selected from the set of online applications and offline applications selected from the set of offline applications, wherein the online applications and the offline applications are selected based on the selected category by the commuter;
      receive at least one of a first or a second request from the second device, wherein the second device transmits at least one of the first or the second request based on at least one of a first input or a second input, respectively, wherein the first or the second input is received by way of a first or a second application selected by the commuter from the offline applications or the online applications, respectively, and wherein the first and second applications are rendered by the first master application installed on the second device;
      retrieve at least one of the first multimedia file from the memory of the first device in response to the first request, or a second multimedia file from a second server in response to the second request by way of a second communication network; and
      stream at least one of the first multimedia file or the second multimedia file on the second device by way of the first communication network.

* * * * *